(12) United States Patent
Galabov

(10) Patent No.: US 6,612,280 B1
(45) Date of Patent: Sep. 2, 2003

(54) INTERNAL COMBUSTION ENGINE

(75) Inventor: Georgi Assenov Galabov, H.C. "Mladost", B1.372, An.I, App. 86, 1712 Sofia (BG)

(73) Assignees: Georgi Assenov Galabov, Sofia (BG); Aneliya Angelova Donkova, Lev Tolstoy (BG); George Stoyanov Stafanov, Mladost (BG)

( * ) Notice: Subject to any disclaimer, the term of this patent is extended or adjusted under 35 U.S.C. 154(b) by 0 days.

(21) Appl. No.: 09/913,436

(22) PCT Filed: Aug. 1, 2000

(86) PCT No.: PCT/BG00/00021

§ 371 (c)(1),
(2), (4) Date: Aug. 14, 2001

(87) PCT Pub. No.: WO01/09492

PCT Pub. Date: Feb. 8, 2001

(30) Foreign Application Priority Data

Aug. 2, 1999 (BG) .................................................. 103624

(51) Int. Cl.[7] .............................. F02B 19/04; F02B 1/12
(52) U.S. Cl. .................................. 123/193.5; 123/193.2
(58) Field of Search ........................... 123/193.5, 193.1, 123/193.2, 193.3, 193.4, 193.6

(56) References Cited

U.S. PATENT DOCUMENTS 1,496,489 A    6/1924  Powell
4,697,554 A  * 10/1987  Bothwell ................. 123/193.5
4,942,857 A  *  7/1990  Yoshikawa ............... 123/193.5
5,163,395 A  * 11/1992  Ishii ....................... 123/193.5
5,421,292 A  *  6/1995  Hoffman et al. ......... 123/193.5
6,082,318 A  *  7/2000  Malatto et al. .......... 123/193.5

FOREIGN PATENT DOCUMENTS

| DE | 313766  | 7/1919  |
| DE | 933901  | 10/1955 |
| GB | 733928  | 7/1955  |
| NL | 6605389 | 10/1967 |

* cited by examiner

*Primary Examiner*—Paul J. Hirsch
(74) *Attorney, Agent, or Firm*—Webb Ziesenheim Logsdon Orkin & Hanson, P.C.

(57) ABSTRACT

An internal combustion engine including a crank-balance beam mechanism and gases-distributing mechanism, towards whose cylinder head is statically mounted a two-walled shell with a separating box positioned on its walls, squeezed and tightened to the piston front face by a plunger with a catching slot housed in a common hydro-chamber and connected with an oil pump. In the hydro-chamber is housed an intercepting rod, suspended on articulation which is periodically linked with a spindle of a micro-piston and installed within a stopping cylinder, connected with an oil pumping-suck distributor. Within the two-walled shell is provided a second feeding hole with a fuel-air valve linked with a cam of a distributive shaft, where the feeding hole is installed in a fuel-spraying device.

14 Claims, 4 Drawing Sheets

— 1 —

INTERNAL COMBUSTION ENGINE

TECHNICAL FIELD

This invention is concerned to a piston four-stroke internal combustion engine, which could be applied as power source for propulsion of any kinds of transports and fixed facilities.

PRIOR ART

A piston four-stroke internal combustion engine with outer air-fuel composite forming is known, which is consist of a cylinder's case composed of "N" in number operation cylinders. Within each of them is located a piston with two dead position. It is coupled to the crankshaft by means of a reel. The operation cylinders are enclosed by a cylindrical head fixed to the cylinder case and formed to the cylindrical head: feeding hole coupled to carburetor with installed within him valve near to the a balancebeam, which is contacting with a distributive shaft cam coupled to the crank-shaft by means of mechanical gearbox with gear ratio 2:1, having and second cam, which is contacting with a second balancebeam with touched to it a valve, installed within formed in the cylindrical head an exhausted hole.

Defects of this engine are: there is an considerable relationship and mutual commitment between engine performance (power, frugality), compression rate in the cylinders operation space, low detonating resistance of used fuel, quality composition (fuel/air ratio) of the fuel/air mixture and the toxical relative environmental pollution per unit of generated power. Thereto, for initiating the "combustion" process is necessary outer thermal source to ignite the fuel/air mixture, whose power is insufficient to ignite a low volatility and high ignition point fuel/air emulsion.

This engine is designed compromisely becaouse of the mentioned above reasons: it will operate at relatively low compression rate of fuel/air mixture when using low detonation resistance fuels or/and fuel-enriched fuel/air mixture with no air surplus.

The negative results of that are: using more cost antidetonating additions fuels, more complicated carburettor, availability of ignition system starting the "combustion" process per any operation cycle, incompletely fuel combustion especially on the idle and overloading modes, increased hazards by detonating combustion in engine overloading, impossibility for using low volatility and high ignition point fuels, increased thermal and toxically environmental pollution because of: more heavy f fuel consumption per unit of generated power, availability of toxic antidetonating fuel additions because of incomplete fuel combustion (1).

TECHNICAL ESSENCE OF THE INVENTION

The goal of this patent is to design an internal combustion engine with enhanced compression rate in the cylinder operation space, higher percentage of the air participating in the combustion process as well as the thermal giving to be enhanced to the operation chamber walls in duration of the combustion process aiming the maximum absorption of the fuel thermal energy, generated in duration of the combustion process and considerable decreasing toxic and thermal environmental pollution per unit of generated power as well as conditions in the cylinder operation space to be estimated for fuel/air emulsion combustion where the fuel is low volatility and high ignition point.

This problem could be resolved by dividing cylinders operation space on the final of "cleaning" process and the start of the "suction" process in two constitutive subspaces. In one of these subspaces, fuel/air mixture with quality composition combusting at optimum possible speed is sucked in on the "suction" process. In other subspace, atmospheric air is sucked in.

On the "compression" process, fuel/air mixture compression is performed separately into the both constitutive subspaces. On the final of the "compression" process, the fuel/air mixture is compressed to a rate admissible for low detonation resistant fuels.

The atmospheric air is compressed to a rate, maximum admissible by toughness viewpoint of constructive materials, enclosing the constitutive subspaces. On the final of the "compression" process, the both constitutive subspaces are fused in single operative space, which presents from the start of the "combustion" process, in duration of the "expansion" process, and to the final of the "cleaning" process. Then the cylinder operation space is again divided in two constitutive subspaces, etc.

The goal is worked out by a piston four-stroke engine, composed by a cylinder case with an operating cylinder and installed to him a piston with two dead operating points, designated Upper Dead Point (UDP) and Bottom Dead Point (BDP). The said piston is coupled by means of a reel to a crankshaft, which has bearing suspension on the cylinder case, whereto a cylinder head is fixed with formed feeding hole in the said cylinder head, with a valve, installed in the said feeding hole. The said valve is touched on a balancebeam, which is contacted with a cam of distributive shafts, which are coupled to the said crankshaft by means of a mechanical gearbox with gear ratio 2:1. They have a second cam, which is contacted with a second balancebeam with a valve touched to the said balancebeam, the said valve is installed in an exhausted hole formed in the said cylinder head. Here, in accordance with present patent, a two-walled shell is fixed with ring-shaped space formed between shell walls, wherein maze-shaped gasket grooves are hollowed out. The ring-shaped space length is equaled or more than piston stroke and said ring-shaped space is terminated in the atmosphere by a one-way valve installed on a bottom connecting in mutual single-end the both wall of the two-walled shell, wherein second feeding hole is formed with installed into him a fuel/air valve touched to a parallel balancebeam coupled by means of lifting rod to balance-beam of the valve, which is installed into the said feeding hole as the second feeding hole is coupled to a carburettor, and within the said ring-shaped space with windage at its two sides and touched to the piston face and tighten to it by means of face cone surfaces is installed a splitting box, which splits inner operating cylinders space on outer constitutive space and inner constitutive space as the last is higher than the said outer constitutive space. The splitting box is fixed to a plunger with formed clamping slot in proximity of the loose end of the said plunger, and the said clamping box is located slot is located within a directing box, which is fixed to the bottom of the said two-walled shell as on opposite side of the said clamping slot in the close proximity of the wall of the said plunger the loose end of an intercepting bar, suspended on a hinge axis, standing over the said clamping slot. The said intercepting bar is located between a pulling spring and installed within a stopping cylinder a micro-piston rod. The said stopping cylinder is fixed to the bottom of the said two-walled shell and it is coupled to a oil pumping/sucking distributor by means of a pipe-line. The directing box, installed to it plunger, the said micro-piston rod and the said stopping cylinder are housed in a common hydro-chamber, coupled to an oil pump.

Besides, a fuel sprayer, but a sparking plug mounting hole is done on the said two-walled shell in parallel of the said second feeding hole.

The advantages of this internal combustion engine are following: First, the high compression ratio of the air in the cylinders operating space, and lowered compression ratio of the fuel/air mixture in the same that space. Besides, the "combustion" process starts in air deficiency and finishes in unlimited air surplus with partial only contact of the fuel flame with operation space enclosing surfaces in duration of the "combustion" process. Second, low volatility and high flame point fuel/air emulsions burn within the cylinders operating space.

The positive results of the above mentioned advantages are following: usage of the more cheap low detonation resisting fuels with no toxic anti-detonation additions in its compounds as well as usage of the more cheap low volatility, high flame point, and risen viscosity fuels as well as powdered fuels; enhanced efficiency, reduced environmental toxical and thermal pollution per unit of generated power.

BRIEF EXPLANATION OF THE DRAWINGS

The invention is explained in more details by exemplary implementation of the engine, showed on attached sketches, such as:

FIG. 2 illustrates the work fluid type, motion direction and pressure in the operation cycle duration as well as thermodynamic processes, such as:

Figure 2A:
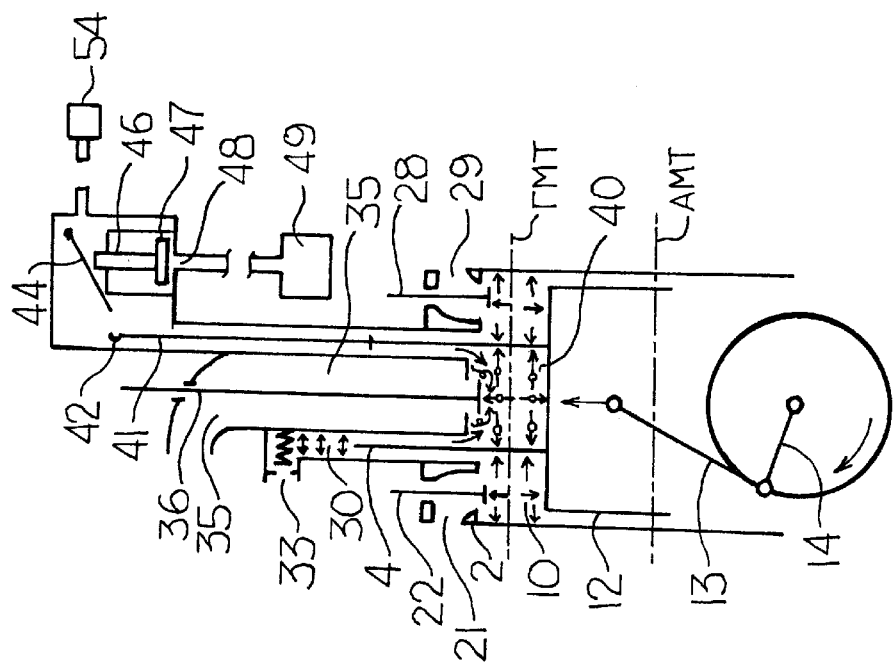
Figure 2B:
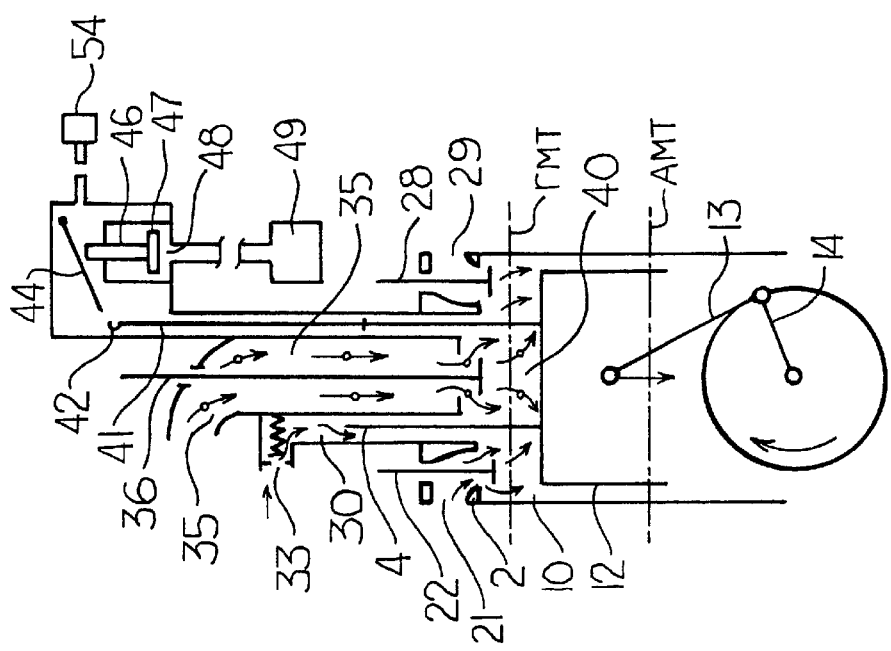
Figure 2C:
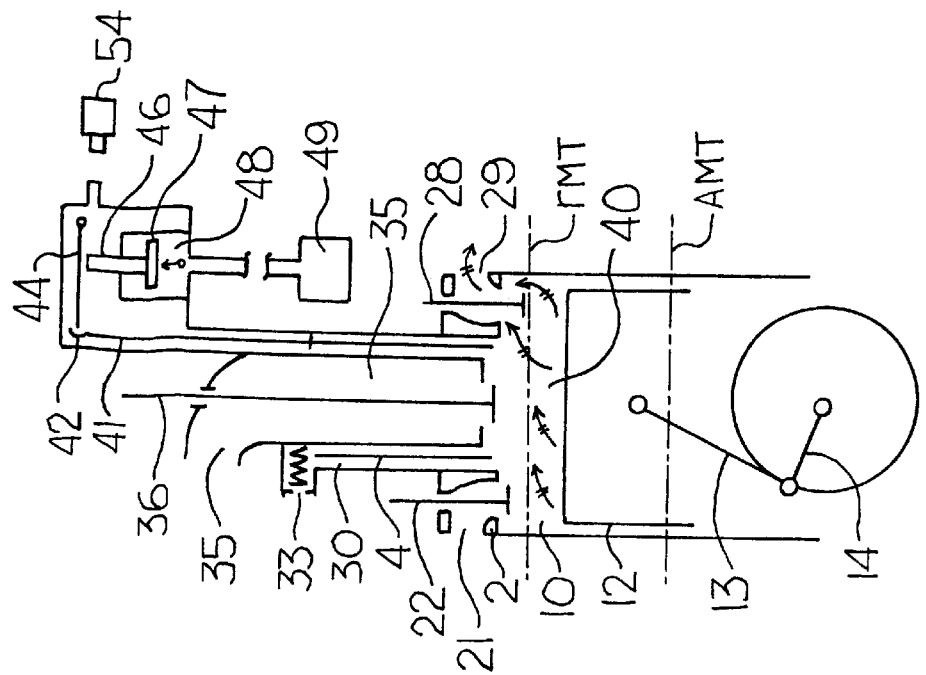
Figure 2D:
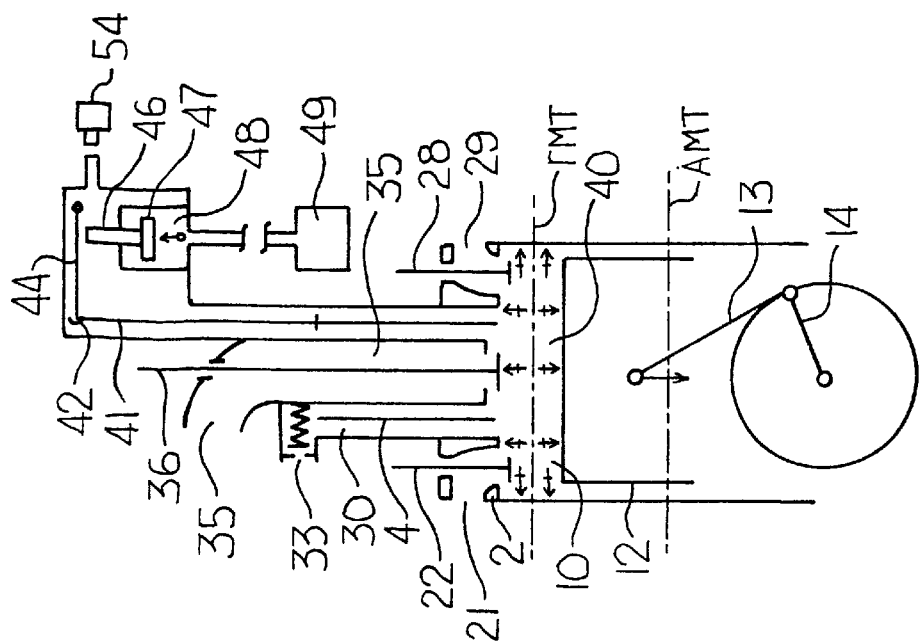

On FIG. 2a—the "suction" process;

On FIG. 2b—the "compression" process;

On FIG. 2c—the "expansion" process;

On FIG. 2d—the "cleaning" process.

The arrows, presented on the attached sketches, note the work fluid type, motion direction or pressure, such as:

→Atmospheric air or compressed air;

⇢Fuel/air mixture;

⇢Fuel flame or exhausts (gases) pressure;

⇢Exhausts (exhausted gases);

⇢Forced kinematic node.

Figure 3A:
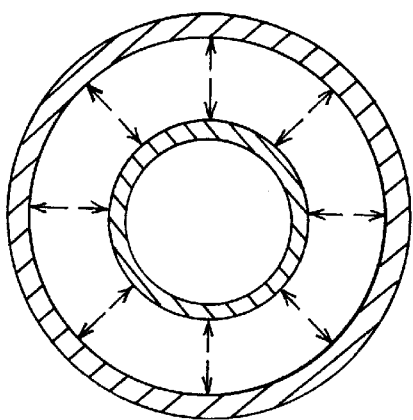
Figure 3B:
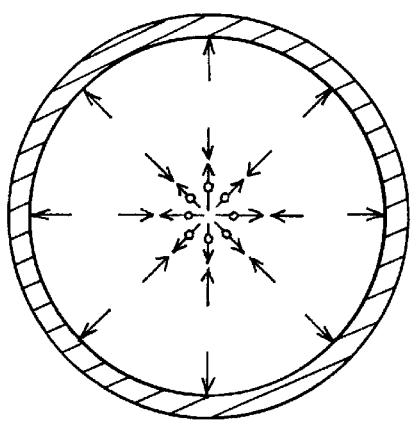
Figure 3C:
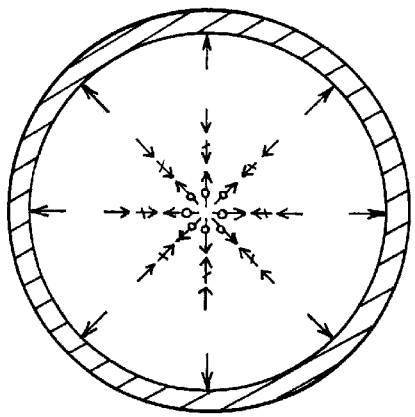
Figure 3D:
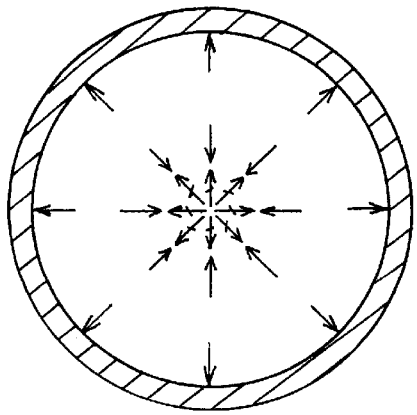
Figure 3E:
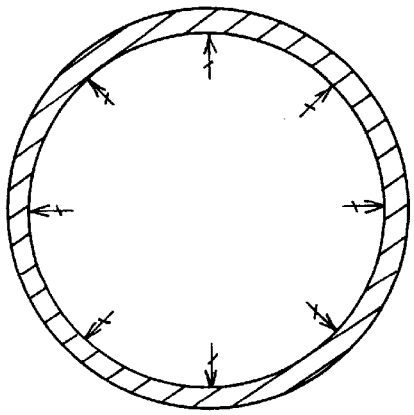

FIG. 3 illustrates the work fluid type, motion direction and pressure from the "compression" process final, in duration of the "combustion" process, to the "expansion" process start, such as:

On FIG. 3a—in the "compression" process final;

On FIG. 3b—in the initial point of termination of the splitting box from the piston face;

On FIG. 3c—in the arising point of the first centers of fire/air mixture combustion;

On FIG. 3d—In the final of the intensive combustion period as well in duration of the burning out products of the imperfect combustion;

On FIG. 3e—on the start and in duration of the "expansion" process.

EXAMPLES OF THE EMBODIMENT OF THE INVENTION

Figure 1:
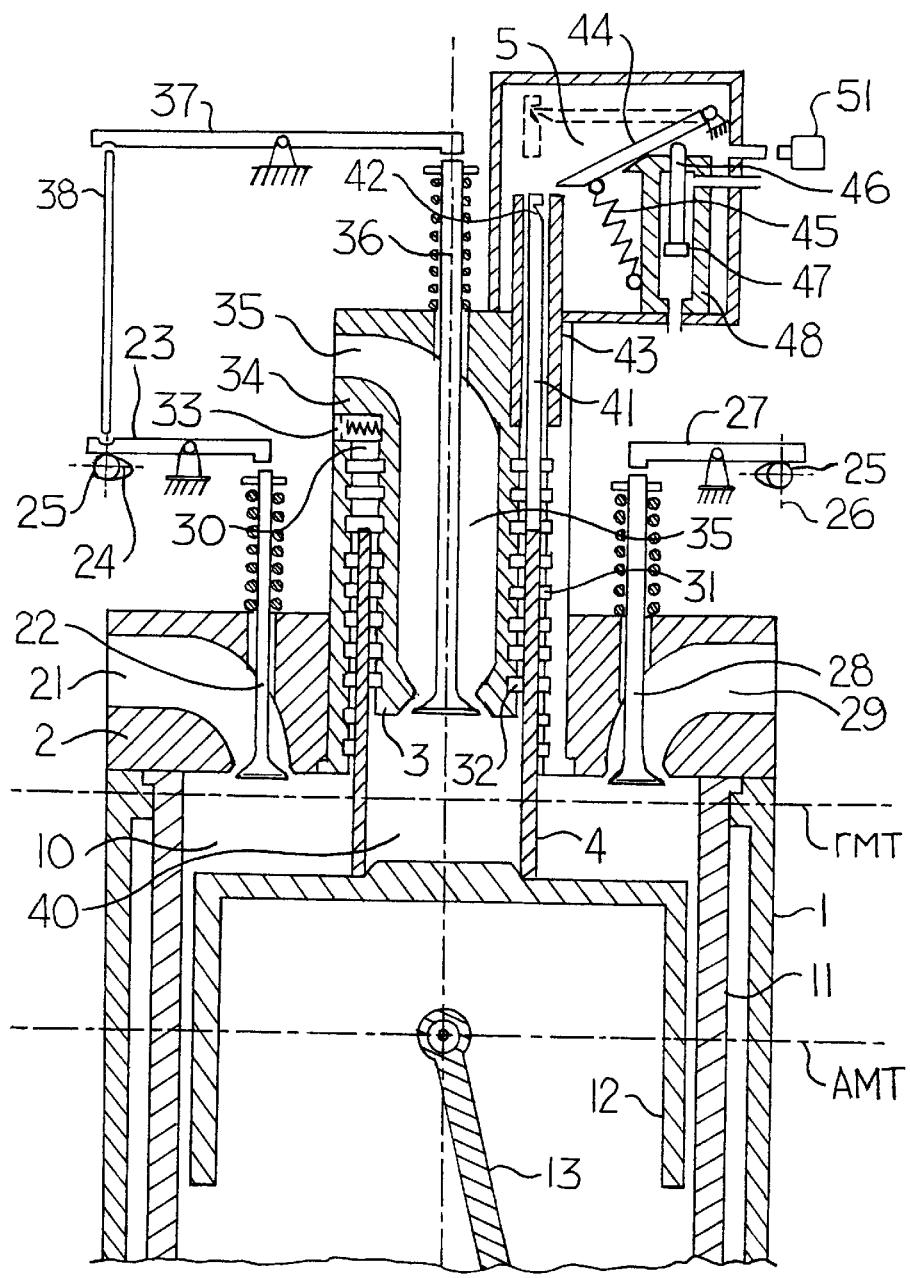
FIG. 1 illustrates Common View of the engine and crankshaft crosscut.

As is shown on FIGS. 1, 2 and 3, the internal combustion engine includes a crank-balancebeam mechanism and a gas-distributive mechanism, which are consist of cylinder case 1 with operating cylinder 11 and installed within it piston 12 with two dead points, designated as "Upper Dead Point (UDP)" and "Bottom Dead Point (BDP)", linked by means of a balancebeam 13 to a crankshaft 14, suspended on bearings in the said cylinder case 1 whereto a cylinder head 2 is fixed with formed in it a feeding hole 21 with installed in it valve 22, rested on balancebeam 23, which is contacted in a cam 24 on the distributive shafts 25, coupled with the said crankshaft 14 by means of mechanical gearbox (it is not showed on the figures) with gear ratio 2:1. The said distributive shafts 25 have a second cam 26, which is contacted with second balance beam 27 with rested on it a valve 28, installed within the exhaust hole 29 formed into the said cylinder head 2, wherein two-walled shell 3 with ring-shaped space 30 formed between its walls is fitted in parallel of the operation cylinder walls. In the said ring-shaped space labyrinth gasket grooves 31, 32, as the said ring-shaped space 30 is longer than the piston 12 stroke and it is terminated into atmosphere by means of the one-way valve 33, fitted on bottom 34, coupling the one end of them the two wall of the said two-walled shell 3 wherein second feeding hole 35 with fitted in it fuel/air valve 36 rested on the said parallel balance beam 37 coupled by means of a lifting rod 38 to the said balancebeam 23 of the said valve 22 fitted on the said feeding hole 21, as the said second feeding hole 35 is coupled to a carburettor (it is not shown on the figures), and in the said ring-shaped space 30 with windage on its both sides and jointed frontally to the said piston 12 and tightened to it by means of face cone surfaces a separation box 4 separating the said inner cylinder 11 space on outer constitutive space 10 and inner constitutive space 40, which is higher than the said outer constitutive space 10.

The said separation box 4 is caught for plunger 41 with formed near to it unattached end catching slot 42 and it is located into the directing box 43, fixed on the said bottom 34 of the said two-walled shell 3 as opposite to the said catching slot 42 in the close proximity of the said plunger 41 wall the unattached end of the hinge suspended standing over the said catching slot 42 intercepting rod 44, which is positioned between a pulling spring 45 and spindle 46 of the a micro-piston 47 installed in the stopping cylinder 48, fixed to the said bottom 34 of the said two-walled shell 3 and connected by pipe line to oil pump-suction distributor 49. The said directing box 43 with the said its plunger 41, the said intercepting rod 44, the said pulling spring 45, the said spindle 46 of the said micro-piston 47 and the said stopping cylinder 48 are housed within a common hydro chamber 5 connected to oil pump 51.

It is possible, toward to the said feeding hole 21 a fuel spraying device, and a sparking plug hole (it is not showed on the figures) in pa-rallel of the said second feeding hole 35 could be cut within the said two-walled shell 3.

APPLICATION OF THE INVENTION

The said common hydro-chamber 5 is filled with compressed oil fed by the said oil pump 51. This pressure turns out compression on the said plunger 41 front face. This compression is delivered on the said separating box 4, and squeezes and firms it to the said piston 12 face and forces it to follow its stroke.

The "suction" process starts at such position of the said distributive shafts 25, where the said cam 24 by means of the said balancebeam 23 is opened the said valve 22 of the feeding hole 21, and by means of the said lifting rod 38 and the said parallel balancebeam 37 is opened the said fuel/air valve 36 of the said second feeding hole 35. At along driving the said piston 12 and the said separating box 4 from "UDP" to the "BPD" because of estimated sub-pressure over the said piston 12 face within the said outer constitutive space 10 through the opened said feeding hole 21 intakes atmospheric air, and within the said inner constitutive space 40 through the opened said second feeding hole 35 intakes fuel/air mixture, prepared in the said carburettor with quality composition equal for all the operation modes with fuel/air weight ratio providing the highest velocity of fuel flame propagation.

The "suction" process finishes when the said piston 12 and the said separating box 4 are reached at "BDP" as the said valve 22 closes the said feeding hole 21 and the said fuel/air valve 36 closes the said second feeding hole 35. Besides, in the said outer constitutive space is closed the entered atmospheric air, and within the said inner constitutive space 40 is closed the entered there fuel/air mixture. In progressing the "suction" process because of the estimated sub-pressure over the top front face of the said separating box 4 within the said outer constitutive space a process of "compression" of located there atmospheric air is proceeding, within the said inner constitutive space 40 a process of "compression" of located there fuel/air mixture is proceeding. However, the pressure and the temperature in the said outer space 10 rise striping because of its less height and in the final of the "compression" process their values are from two to four times higher than respective values within the said inner space, which are, respectively, pressure 4÷6 MN/m² (MPa) and temperature 800÷1000° K for the compressed air within the said outer constitutive space 10 and pressure 0.7÷2 MN/m² (MPa) and temperature 400° K÷700° K for the compressed within the said inner constitutive space 40 fuel/air mixture. A process of "compression" proceeds in the said ring-shaped space 30 along with it and a process of pushing out of closed here atmospheric air, which because of the lower pressure and hydraulic resistance between the wall of the said separating box 4 and the outside wall of the said two-walled shell 3 in relation to ones between the separating box 4 wall and the outside wall of the said tow-walled shell 3, enters into the said inner constitutive space 40, whereupon a turbulence is obtained of the compressed here fuel/air mixture, improving fuel vaporization and the fuel/air mixture homogenization.

The "compression" process is finished before the said piston 12 to reach "UDP".

The "combustion" process starts shortly after the said piston 12 is reached 10°÷5° before the "UDP" when the oil pumping-sucking distributor 49 feeds compressed oil to the stopping cylinder 48. Besides, the micro-piston 47 by means of the spindle 46 presses the intercepting rod 44 that overcome the strength of the pulling spring 45 and the said micro-piston 47 is turn about its articulation as after that its unattached end enter into the catching slot 42 of the said plunger 41 and drives accelerating the said plunger 41 along with the said separating box 4, which is obtained motion speed higher than ones of the piston 12, driving still to the "UDP". Then, the said separating box 4 is moved away form its front face, the oil pressure in the said stopping cylinder holds back the said micro-piston 47 in the upper dead position, the said separating box 4 is left in upper dead position too. In the point of leaving the said separating box 4 from the front face of the said piston 12 the both constitutive spaces—the outer 10 and inner 40 are fuse in single space. In this moment, the compressed atmospheric air from the said outer constitutive space 10 because of its higher pressure radially penetrates in circle front to the compressed fuel/air mixture, surrounded by the wall of the said separating box 4 and the said hot compressed air because of its higher temperature (800° C.÷1000° C.) ignites the fuel/air mixture simultaneously on all the ring-shaped band circumference where compressed up different extent atmospheric air and fuel/air mixture are in contact as the fuel flame radially spreads to the axis of the said operation cylinder 11, surrounded by compressed air located between the fuel flame and the walls of the said operation cylinder 11.

Besides, the fuel flame is axially diffused too from the front face of the said piston 12 to the inner face wall of the said two-walled shell 3. The "combustion" process because of high pressure and temperature of the compressed atmospheric air; considerable reduced spreading range of fuel flame and the decreased thermal giving to the wall enclosing the room of the said operation cylinder 11 hence that compressed air, is located between them, which in same time is thermoisolating barrier, proceeds in constant volume immediate to the "UDP", as the pressure is reached 5÷12 MN/m² (MPa), but the temperature—2300° K÷2800° K.

The "expansion" process starts from the stroke of the said piston 12 from "UDP" to "BDP", but the said separating box remains static in the upper dead position, because of the said micro-piston 47 is locked in upper dead position by the oil pressure within the said stopping cylinder 48. The "expansion" process accomplishing useful performance finales when the said piston 12 reaches in the "BDP" an the distributing shaft are in such positions that the cam 26 by means of the balancebeam 27 opens the valve 28 of the exhaust hole 29.

The "cleaning" process starts from piston 12 stroke from "BDP" to "UDP" when the waste gases are pushed out into the ambient space through the opened by the said valve 28 the said exhaust hole 29. The "cleaning" process finishes 10÷15° before the said piston 12 to reach "UDP" when the said oil pumping-sucking distributor is sucking the oil from the said stopping cylinder 48, and the said micro-piston 47 with its spindle 46 are running down, besides, the said intercepting rod 44, initiated by the force of the said pulling spring 45, is existing from the said catching slot 42 of the said plunger 41. The said separating box 4, initiated by oil pressure in the common hydro-chamber (generated by the said oil pump 51 on the front face of the said plunger 41, is squeezed again to the front face of the said piston 12, the said feeding hole 21 again is opened by the said valve 22 and the second feeding hole 35—by the said fuel/air valve 36, etc, when the next operation cycle starts in the operation space of the said operation cylinder 11.

For other variant implementation of such engine with installed fuel-spraying device (it is not shown in the figures) to the said feeding hole 21.

The fuel-spraying device sprays low volatile and high flaming point fuel into the atmospheric air passing through the said feeding hole 21 into the said outer constitutive space 10, and in the same time in progress of the "suction" process the fuel/air emulsion enters into the said outer space 10 and into the said inner space 40 enters fuel/air mixture having mentioned above quality composition.

The "compression" process proceeds separately within the both said outer and inner constitutive space, respectively 10 and 40, by mentioned above approach, as the fuel/air mixture temperature is risen up to 800–1000° K in the final of the "compression" process. When the said separating box is moved away from piston 12 face, the fuel/air emulsion from the said outer constitutive space 10 penetrates radially in circular front to the fuel/air mixture, surrounded by the separating box 4 walls and because of its high temperature it ignites the fuel/air mixture, which with its fuel flame possessing very high temperature up to 2300–2800° K and its big power ignites the fuel/air emulsion. The "combustion" process proceeds in two stages: fuel/air mixture combustion in constant volume, and fuel/air emulsion combustion in constant pressure.

For variant implementation of such engine with sparking plug installed with a hole done within the said two-walled shell 3 in parallel of the said feeding hole 21, the fuel-air mixture compressed into the said inner constitutive space 40 ignites in the moment before moving away separating box 4 from the front face of the said piston 12.

REFERENCE

"Toplotehnika", Tehnika, Sofia, 1967, pp. 353÷363

What is claimed is:

1. An internal combustion engine, comprising a cylinder case with a cylinder positioned therein, the cylinder having a piston therein, coupled by a balancebeam to a crankshaft on bearing suspension in the cylinder case having a cylinder head; the cylinder head includes a feeding hole with a valve in operable communication therewith and an exhaust hole with a valve in operable communication therewith; each valve in contact with a balancebeam contacting a distributing shaft cam, coupled with the crankshaft by a mechanical gearbox with gear ratio 2:1, a shell, a separating box and a plunger; wherein a space within the cylinder, during the "suction" and "compression" processes, includes: an outer constitutive space and an inner constitutive space, separated by a separating box positioned at least partially within a ring-shaped space, the ring-shaped space formed between walls of a two-walled shell with a bottom connected to the cylinder head; a secondary feeding hole is formed within the two-walled shell and includes a fuel/air valve in operable communication with a parallel balancebeam, coupled by a lifting rod with the balancebeam of the feeding hole valve; the ring-shaped space is in communication with the atmosphere by a one-way valve installed adjacent the bottom of the two-walled shell; a directing box is positioned adjacent the two-walled shell and includes a plunger, attached to the separating box at one end and having a catching slot at the other end; the plunger catching slot is in operable communication with an intercepting rod positioned between a pulling spring and a spindle of a micro-piston; a portion of the directing box, the plunger, the intercepting rod, the pulling spring, and the spindle are housed within a common hydrochamber, which is coupled with an oil pump.

2. The internal combustion engine of claim 1, further comprising a fuel spraying device in communication with the feeding hole and configured to inject fuel into the feeding hole.

3. The internal combustion engine of claim 1, further comprising a sparking plug hole positioned in a substantially parallel relationship with the secondary feeding hole formed within the two-walled shell.

4. The internal combustion engine of claim 1, wherein the operable height of the outer constitutive space is less than the operable height of the inner constitutive space.

5. The internal combustion engine of claim 4, wherein, during at least a portion of the combustion process, compressed air in the outer constitutive space has a pressure in the range of about 4 to about 6 MPa and a temperature in the range of about 800 to about 1000° K.

6. The internal combustion engine of claim 4, wherein, during at least a portion of the combustion process, compressed air in the inner constitutive space has a pressure in the range of about 0.7 to about 2 MPa and a temperature in the range of about 400 to about 700° K.

7. The internal combustion engine of claim 1, wherein a state of turbulence is obtained in one of the inner constitutive space and outer constitutive space, thereby improving fuel vaporization and fuel/air mixture homogenization.

8. The internal combustion engine of claim 1, further comprising an oil pumping/sucking distributor configured to feed compressed oil to the stopping cylinder.

9. The internal combustion engine of claim 1, wherein the combustion process proceeds through a stage where a fuel/air mixture combustion is at constant volume.

10. The internal combustion engine of claim 1, wherein the combustion process proceeds through a stage where a fuel/air emulsion combustion is at constant pressure.

11. The internal combustion engine of claim 1, wherein the internal combustion engine is used in a piston four-stroke internal combustion engine.

12. The internal combustion engine of claim 11, wherein the internal combustion engine is used as a power source.

13. The internal combustion engine of claim 12, wherein the power source is used for the propulsion of one of a transportation unit and a fixed unit.

14. The internal combustion engine of claim 1, wherein a portion of fuel injected into the internal combustion engine is at least one of a low detonation resisting fuel, a fuel with no toxic anti-detonation additive, a low volatility fuel, a high flame point fuel, an elevated viscosity fuel and a powdered fuel.

* * * * *